(12) United States Patent
Lee et al.

(10) Patent No.: US 9,960,606 B2
(45) Date of Patent: May 1, 2018

(54) WIRELESS POWER RECEPTION APPARATUS AND METHOD BASED ON SWITCHING

(71) Applicant: Samsung Electronics Co., Ltd., Suwon-si (KR)

(72) Inventors: Jaechun Lee, Seoul (KR); Ui Kun Kwon, Hwaseong-si (KR); Sang Joon Kim, Hwaseong-si (KR); Seungkeun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 803 days.

(21) Appl. No.: 14/533,416

(22) Filed: Nov. 5, 2014

(65) Prior Publication Data

US 2015/0340873 A1 Nov. 26, 2015

(30) Foreign Application Priority Data

May 21, 2014 (KR) .................. 10-2014-0061010

(51) Int. Cl.
*H01F 27/42* (2006.01)
*H01F 37/00* (2006.01)
*H01F 38/00* (2006.01)
*H02J 5/00* (2016.01)
*H02J 50/12* (2016.01)

(52) U.S. Cl.
CPC .............. *H02J 5/005* (2013.01); *H02J 50/12* (2016.02)

(58) Field of Classification Search
CPC .................................. H02J 50/12; H02J 5/005
See application file for complete search history.

(56) References Cited

U.S. PATENT DOCUMENTS

| 8,432,070 | B2 | 4/2013 | Cook et al. | |
|---|---|---|---|---|
| 2010/0148723 | A1 | 6/2010 | Cook et al. | |
| 2010/0244580 | A1* | 9/2010 | Uchida | H02J 5/005 307/104 |
| 2010/0270970 | A1* | 10/2010 | Toya | H02J 7/0027 320/108 |
| 2011/0227420 | A1* | 9/2011 | Urano | H02J 17/00 307/104 |
| 2011/0241437 | A1 | 10/2011 | Kanno | |
| 2011/0316347 | A1* | 12/2011 | Endo | H04B 5/0037 307/104 |

(Continued)

FOREIGN PATENT DOCUMENTS

| KR | 10-2011-0094739 A | 8/2011 |
|---|---|---|
| KR | 10-2011-0108596 A | 10/2011 |

(Continued)

*Primary Examiner* — Jared Fureman
*Assistant Examiner* — Esayas Yeshaw
(74) *Attorney, Agent, or Firm* — NSIP Law

(57) ABSTRACT

A wireless power reception apparatus includes a reception (RX) resonator configured to form a resonance coupling with a first resonance period associated with an envelope of a power to receive the power from a transmission (TX) resonator; a switch controller configured to generate, at intervals of the first resonance period, a control signal to deactivate the RX resonator at an off timing corresponding to a time instant at which a maximum energy is stored in an inductor of the RX resonator; and a switch configured to deactivate the RX resonator in response to the control signal.

24 Claims, 22 Drawing Sheets

(56) References Cited

U.S. PATENT DOCUMENTS

| | | | |
|---|---|---|---|
| 2012/0056485 A1* | 3/2012 | Haruyama | H02J 5/005 307/104 |
| 2012/0080957 A1* | 4/2012 | Cooper | H02J 5/005 307/104 |
| 2012/0112554 A1* | 5/2012 | Kim | H02J 5/005 307/104 |
| 2012/0293118 A1 | 11/2012 | Kim et al. | |
| 2012/0306287 A1 | 12/2012 | Kim et al. | |
| 2013/0049484 A1* | 2/2013 | Weissentern | H02J 5/005 307/104 |
| 2013/0099591 A1 | 4/2013 | Yeo et al. | |
| 2013/0203355 A1* | 8/2013 | Ootani | G06K 19/0726 455/41.2 |
| 2013/0257173 A1* | 10/2013 | Saitoh | H01F 38/14 307/104 |
| 2014/0184152 A1* | 7/2014 | Van Der Lee | H02J 5/005 320/108 |
| 2015/0340881 A1* | 11/2015 | Nakano | H02J 5/005 307/104 |
| 2015/0357991 A1* | 12/2015 | Ono | H02J 17/00 320/108 |

FOREIGN PATENT DOCUMENTS

| | | |
|---|---|---|
| KR | 10-2013-0045167 A | 5/2013 |
| KR | 10-2013-0082244 A | 7/2013 |
| KR | 10-2013-0094033 A | 8/2013 |
| KR | 10-2013-0114473 A | 10/2013 |

* cited by examiner

WIRELESS POWER RECEPTION APPARATUS AND METHOD BASED ON SWITCHING

CROSS-REFERENCE TO RELATED APPLICATIONS

This application claims the benefit under 35 USC 119(a) of Korean Patent Application No. 10-2014-0061010 filed on May 21, 2014, in the Korean Intellectual Property Office, the entire disclosure of which is incorporated herein by reference for all purposes.

BACKGROUND

1. Field

The following description relates to a method and apparatus for wirelessly receiving power.

2. Description of Related Art

Research on wireless power transmission has been conducted to overcome an increase in the inconvenience of wired power supplies, or the limited capacity of conventional batteries, due to an explosive increase in various electronic devices including mobile devices. In particular, there has been a concentration on research on near-field wireless power transmission. Near-field wireless power transmission is wireless power transmission in which a distance between a transmission coil and a reception coil is small compared to a wavelength at an operating frequency. For example, a wireless power transmission system using resonance characteristics may include a source configured to supply a power, and a target configured to receive the supplied power. When wireless power is transmitted and received, the source and the target may need to share control information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power reception apparatus includes a reception (RX) resonator configured to form a resonance coupling with a first resonance period associated with an envelope of a power to receive the power from a transmission (TX) resonator; a switch controller configured to generate, at intervals of the first resonance period, a control signal to deactivate the RX resonator at an off timing corresponding to a time instant at which a maximum energy is stored in an inductor of the RX resonator; and a switch configured to deactivate the RX resonator in response to the control signal.

The switch controller may include a voltage sensor configured to sense a first voltage signal corresponding to the power received by the RX resonator; a timing setter configured to set the off timing based on the first voltage signal; and a control signal generator configured to generate the control signal at the set off timing at the intervals of the first resonance period.

The timing setter may be further configured to detect at least one voltage peak from the sensed first voltage signal during the first resonance period, and set the off timing based on the detected at least one voltage peak.

The timing setter may be further configured to detect at least one maximum peak from the detected at least one voltage peak, select a last maximum peak from the detected at least one maximum peak during the first resonance period, and set, as the off timing, a time instant that corresponds to a minimum absolute value of the first voltage signal and that precedes a time instant at which the selected last maximum peak is detected.

The timing setter may be further configured to set, as the off timing, a time instant that precedes the time instant at which the selected last maximum peak is detected by a quarter of a second resonance period associated with a peak of the first voltage signal.

The timing setter may be further configured to detect at least one maximum peak from the detected at least one voltage peak, select at least one maximum peak corresponding to a predetermined criterion from the detected at least one maximum peak during the first resonance period, and set at least one off timing corresponding to a time instant that corresponds to a minimum absolute value of the first voltage signal and that precedes at least one time instant at which the selected at least one maximum peak is detected.

The control signal generator may include a delay line configured to delay a reference clock signal having a clock frequency by a predetermined delay, and generate the control signal.

The switch controller may be further configured to observe a second voltage signal applied to a load by deactivating the switch at intervals of at least one predetermined time instant in the first resonance period, and set, as an off timing, a time instant at which the observed second voltage signal has a maximum magnitude.

The switch controller may be further configured to detect $N_1$ second voltage signals by deactivating the switch at each of $N_1$ time instants in the first resonance period, select a first time instant at which a maximum second voltage signal among the $N_1$ second voltage signals is detected, detect $2N_2+1$ second voltage signals by deactivating the switch at each of $2N_2+1$ time instants in a predetermined interval including the first time instant, and set, as the off timing, a second time instant at which a maximum second voltage signal among the $2N_2+1$ second voltage signals is detected.

The switch may be further configured to deactivate the RX resonator by turning off a capacitor of the RX resonator.

In another general aspect, a wireless power reception method includes forming a resonance coupling with a first resonance period associated with an envelope of a power to receive the power from a transmission (TX) resonator; generating, at intervals of the first resonance period, a control signal to deactivate a reception (RX) resonator at an off timing corresponding to a time instant at which a maximum energy is stored in an inductor of the RX resonator; and deactivating the RX resonator in response to the control signal.

The generating may include sensing a first voltage signal corresponding to the power; setting the off timing based on the first voltage signal; and generating the control signal at the set off timing at intervals of the first resonance period.

The setting may include detecting at least one voltage peak from the sensed first voltage signal during the first resonance period; and setting the off timing based on the detected at least one voltage peak.

The detecting may include detecting at least one maximum peak from the detected at least one voltage peak; and the setting of the off timing based on the detected at least one voltage peak may include selecting a last maximum peak from the detected at least one maximum peak during the first resonance period; and setting, as the off timing, a time instant that corresponds to a minimum absolute value of the first voltage signal and that precedes a time instant at which the selected last maximum peak is detected.

The setting, as the off timing, of the time instant that corresponds to the minimum absolute value of the first voltage signal and that precedes the time instant at which the selected last maximum peak is detected may include setting, as the off timing, a time instant that precedes the time instant at which the selected last maximum peak is detected by a quarter of a second resonance period associated with a peak of the first voltage signal.

The detecting may include detecting at least one maximum peak from the detected at least one voltage peak; and the setting of the off timing based on the detected at least one voltage peak may include selecting at least one maximum peak corresponding to a predetermined criterion from the detected at least one maximum peak during the first resonance period; and setting at least one off timing corresponding to a time instant that corresponds to a minimum absolute value of the first voltage signal and that precedes at least one time instant at which the selected at least one maximum peak is detected.

The generating may include delaying a reference clock signal having a clock frequency by a predetermined delay, and generating the control signal.

The generating may include observing a second voltage signal applied to a load by deactivating the switch at intervals of at least one predetermined time instant in the first resonance period; and setting, as an off timing, a time instant at which the observed second voltage signal has a maximum magnitude.

The observing may include detecting $N_1$ second voltage signals by deactivating the switch at each of $N_1$ time instants in the first resonance period; selecting a first time instant at which a maximum second voltage signal among the $N_1$ second voltage signals is detected; and detecting $2N_2+1$ second voltage signals by deactivating the switch at each of $2N_2+1$ time instants in a predetermined interval including the first time instant; and the setting, as an off timing, of the time instant at which the observed second voltage signal has the maximum magnitude may include setting, as the off timing, a second time instant at which a maximum second voltage signal among the $2N_2+1$ second voltage signals is detected.

The deactivating may include deactivating the RX resonator by turning off a capacitor of the RX resonator.

Other features and aspects will be apparent from the following detailed description, the drawings, and the claims.

BRIEF DESCRIPTION OF THE DRAWINGS

FIG. 6 illustrates an example of an operating state of a wireless power reception apparatus when a switch of the wireless power reception apparatus is turned on.

DETAILED DESCRIPTION

Figure 1:
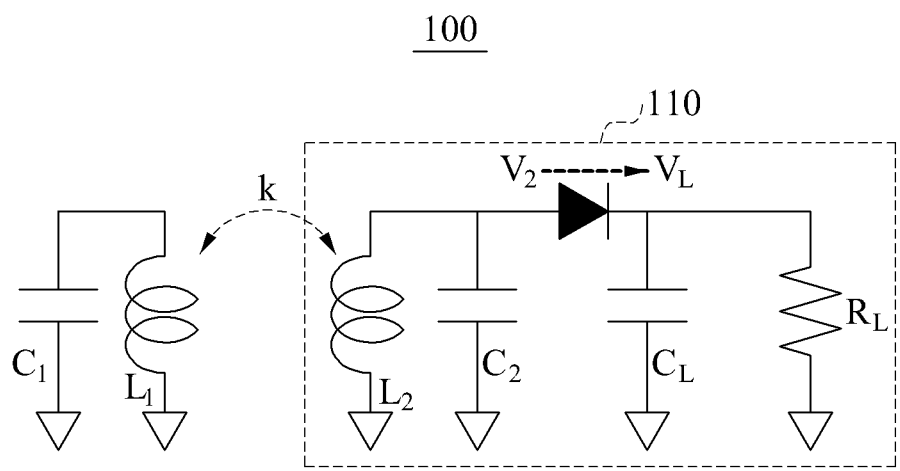
FIG. 1 illustrates an example of a wireless power transmission system including mutually coupled resonators according to a related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission system 100 including mutually coupled resonators according to a related art.

When a first voltage $V_2$ of a received power is higher than a second voltage $V_L$ of a load $R_L$, a receiver 110 used in the wireless power transmission system 100 transfers the received power to the load $R_L$. In this application, the terms "first voltage" and "first voltage signal" may be interchangeably used with respect to each other, and the terms "second voltage" and "second voltage signal" may be interchangeably used with respect to each other.

In the following description, $C_1$ denotes a capacitor of a transmitter, $L_1$ denotes an inductor of the transmitter, $L_2$ denotes an inductor of the receiver 110, $C_2$ denotes a capacitor of the receiver 110, and $C_L$ denotes a capacitor connected to the load $R_L$.

Figure 2:
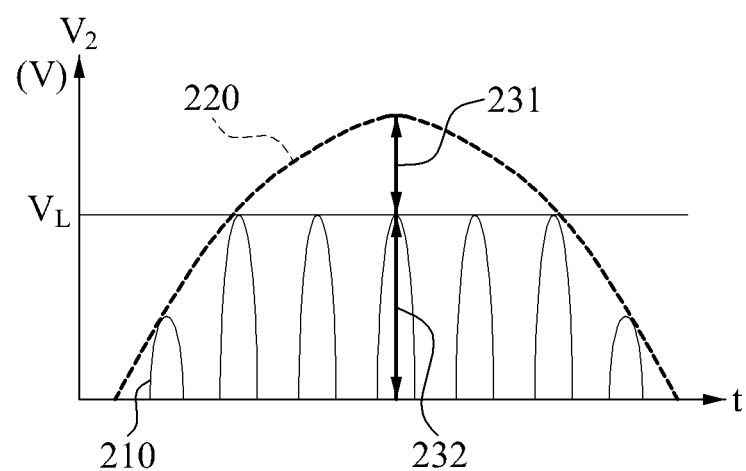
FIG. 2 illustrates an example of power and a waveform of a voltage received by a reception (RX) resonator in a wireless power transmission system according to a related art.

FIG. 2 illustrates an example of power and a waveform of a voltage received by a reception (RX) resonator in a wireless power transmission system according to a related art.

In FIG. 2, a first voltage $V_2$ of a power received by a receiver and an envelope 220 of the first voltage $V_2$ are represented by a solid line 210 and a dotted line 220, respectively. As illustrated in FIG. 2, the first voltage $V_2$ may be limited to a second voltage $V_L$ applied to a load.

A total amount of energy received by the receiver in the wireless power transmission system is represented by "$C_2 V_2^2/2$," and corresponds to a size of the envelope 220. An amount of energy transferred to the load is represented by "$C_2(V_2^2 - V_L^2)/2$," and corresponds to a magnitude of a voltage 231. Additionally, an amount of energy consumed by a resonator in the receiver is represented by "$C_2 V_L^2/2$," and corresponds to a magnitude of a voltage 232.

Figure 3:
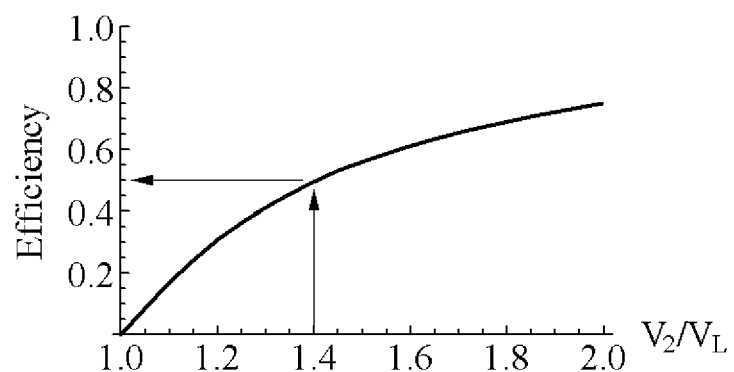
FIG. 3 illustrates an example of an efficiency of a power transferred to a load with respect to a power received by a receiver in a wireless power transmission system according to a related art.

FIG. 3 illustrates an example of an efficiency of a power transferred to a load with respect to a power received by a receiver in a wireless power transmission system according to a related art.

An efficiency of transferring the power received by the receiver to the load may be obtained by dividing the power transferred to the load by the power received by the receiver. Referring to FIG. 3, when $V_2/V_L$ is "1.4," the efficiency is 50%. For example, when a first voltage $V_2$ received by the receiver is higher than 1.4 times a second voltage $V_L$ of the load, the efficiency is higher than 50%.

As illustrated in FIG. 3, when a magnitude of the first voltage $V_2$ is similar to a magnitude of the second voltage $V_L$, for example, when a value of $V_2/V_L$ is close to "1," an amount of power transferred to the load is sharply reduced. When the first voltage $V_2$ is lower than the second voltage $V_L$, for example, when the value of $V_2/V_L$ is less than "1," the power is not transferred to the load, despite the power being received.

In the above wireless power transmission system, to efficiently transfer the power received by the receiver to the load, the second voltage $V_L$ of the load may need to be reduced. Additionally, to provide an appropriate voltage from the receiver to the load in the wireless power transmission system, boosting a voltage may be required by adding a direct current (DC)-to-DC (DC/DC) converter to a rear side of an RX resonator in the receiver.

Figure 4:
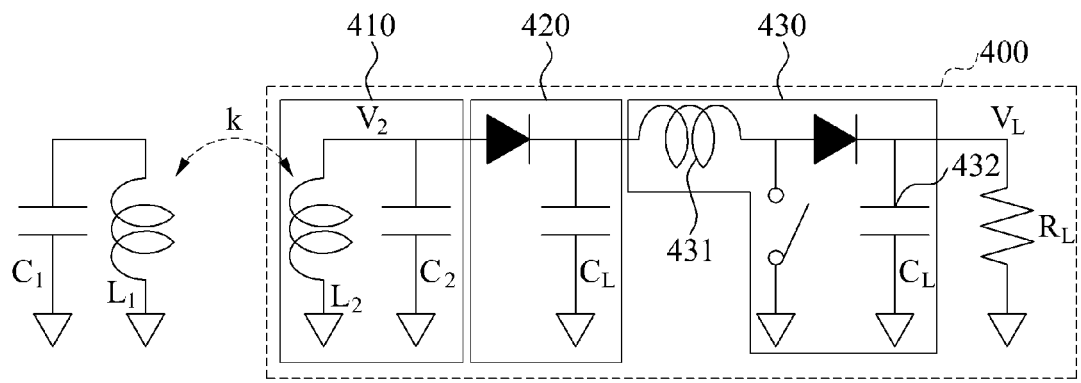
FIG. 4 illustrates an example of a configuration of a receiver in a wireless power transmission system according to a related art.

FIG. 4 illustrates an example of a configuration of a receiver 400 in a wireless power transmission system according to a related art.

In the receiver 400 of FIG. 4, a diode connects an RX resonator 410 to a load at a rear side of the RX resonator 410, and to prevent a power transferred from the receiver 400 to the load from flowing backward to the RX resonator 410. As illustrated in FIG. 4, the RX resonator 410 includes an inductor $L_2$ and a capacitor $C_2$, and the load includes a capacitor $C_L$ and a resistor $R_L$. For example, when a first voltage is higher than a second voltage, a power will be supplied to the load based on a current flowing to the diode, and the diode will prevent the current from flowing backward. Additionally, a rectifier 420 includes the diode.

In another example, when a first voltage $V_2$ of the RX resonator 410 is higher than a second voltage $V_L$ of the load, power corresponding to a difference between the first voltage $V_2$ and the second voltage $V_L$ in power received at the RX resonator 410 will be transferred to the load. In this example, power remaining in the RX resonator 410 will be consumed. An amount of the received power, an amount of the power transferred to the load, and an amount of the power remaining in the RX resonator 410 are represented by "$C_2 V_2^2/2$" "$C_2(V_2^2 - V_L^2)/2$," and "$C_2 V_L^2/2$," respectively, as described above with respect to FIG. 2. Accordingly, an efficiency of power transferred to the load in the received power is represented by a ratio $V_2/V_L$ of the first voltage $V_2$ to the second voltage $V_L$, as shown in Equation 1 below.

$$\text{Efficiency} = \frac{\text{Power transferred to load}}{\text{Power received at } RX \text{ resonator}} = \frac{V_2^2 - V_L^2}{V_2^2} = 1 - \left(\frac{V_2}{V_L}\right)^{-2} \quad \text{[Equation 1]}$$

In the configuration of FIG. 4, to provide an appropriate voltage to the load, the receiver 400 may supply a boosted power by adding a DC/DC converter 430 to the rear side of the RX resonator 410.

For example, when a power is stored in the form of current in an inductor 431 included in the DC/DC converter 430, the DC/DC converter 430 transfers the power in the form of voltage to a capacitor 432 included in the DC/DC converter 430 using a switch. As described above, the DC/DC converter 430 converts a power from a low voltage and a high current to a high voltage and a low current, and boosts the received power from a low voltage to an appropriate voltage, for example, the second voltage $V_L$.

Figure 5:
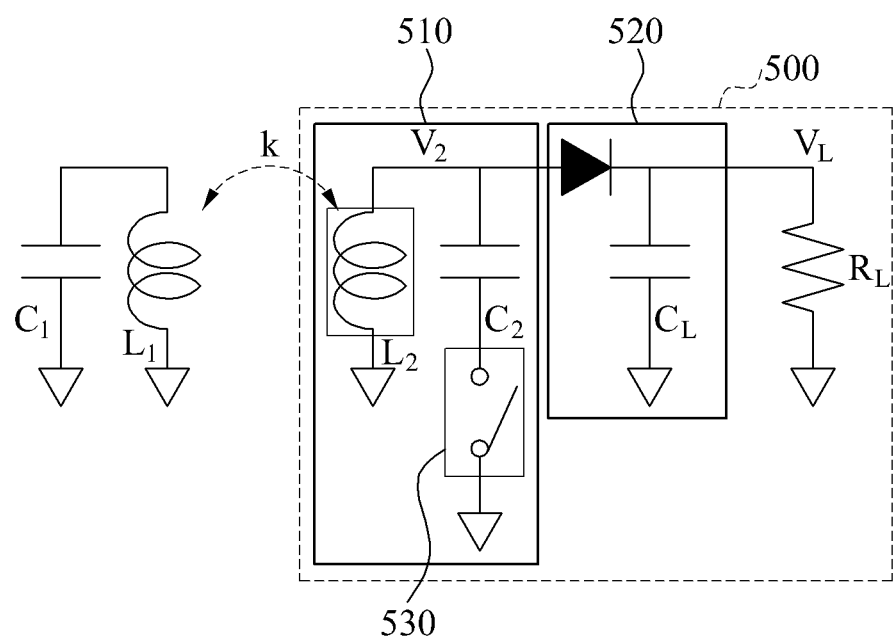
FIG. 5 illustrates an example of a configuration of a wireless power reception apparatus.

FIG. 5 illustrates an example of a configuration of a wireless power reception apparatus 500.

Referring to FIG. 5, the wireless power reception apparatus 500 includes an RX resonator 510, a rectifier 520, and a switch 530. The rectifier 520 operates as described above with reference to FIG. 4.

The RX resonator 510 includes an inductor $L_2$ and a capacitor $C_2$ as illustrated in FIG. 5. A first voltage $V_2$ of the RX resonator 510 resonates as illustrated in FIG. 2. Resonating is a phenomenon in which a received power is alternately converted to a power in the form of a current (for example, stored in an inductor of an RX resonator), and a power in the form of a voltage (for example, stored in a capacitor of the RX resonator). Additionally, the RX resonator 510 forms a resonance coupling with a transmission (TX) resonator having a coupling coefficient k, and receives a power from the TX resonator. The TX resonator includes a capacitor $C_1$ and an inductor $L_1$ as illustrated in FIG. 5.

In an example, a DC/DC conversion function may be performed by the inductor $L_2$ of the RX resonator 510 and the switch 530 added to the RX resonator 510, and accordingly the wireless power reception apparatus 500 does not need a DC/DC converter. An example of the DC/DC conversion function performed by the switch 530 will be further described with reference to FIGS. 6 and 7.

Figure 6:
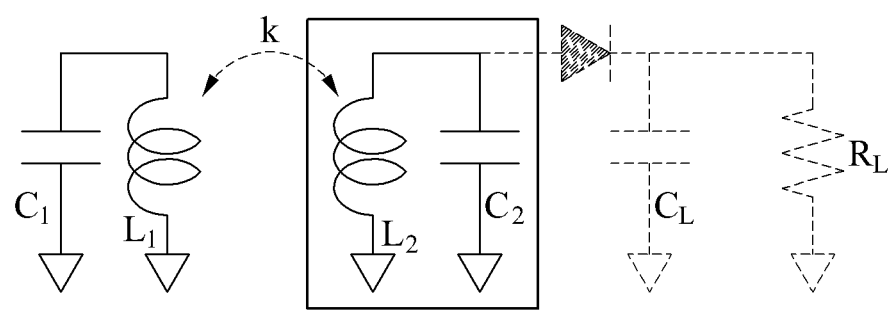
Figure 7:
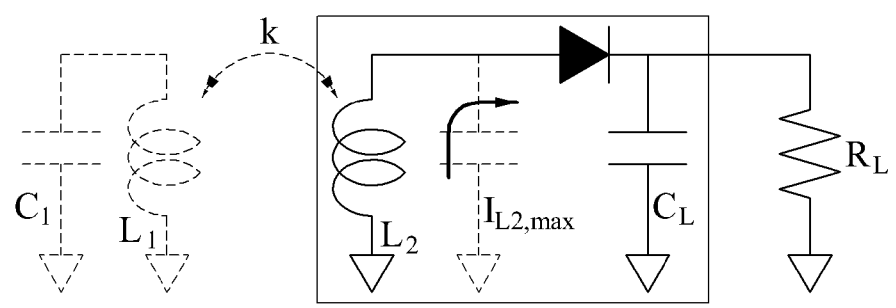
FIG. 7 illustrates an example of an operating state of a wireless power reception apparatus when a switch of the wireless power reception apparatus is turned off.

FIG. 6 illustrates an example of an operating state of a wireless power reception apparatus when a switch of the wireless power reception apparatus is turned on. FIG. 7 illustrates an example of an operating state of a wireless power reception apparatus when a switch of the wireless power reception apparatus is turned off.

For example, when the switch 530 added to the capacitor $C_2$ in the RX resonator 510 of FIG. 5 is turned on, or is shorted, when the wireless power reception apparatus is turned on, or when each resonance period (for example, a first resonance period) starts, as illustrated in FIG. 6, the RX resonator 510 operates similarly to a typical RX resonator (for example, the RX resonator 410 of FIG. 4) and receives a power.

In this example, when a received energy exists in the form of current in the inductor $L_2$ of the RX resonator 510, and when the switch is turned off, or is open, the wireless power reception apparatus of FIG. 7 operates as a DC/DC converter. For example, the power stored in the form of current in the inductor $L_2$ is transferred to a capacitor $C_L$ of a load at a rear side of the RX resonator 510. All of the power received by the RX resonator 510 is transferred to the load, regardless of a second voltage (for example, a voltage $V_L$ of the load). The load includes a resistor $R_L$ and the capacitor $C_L$.

As described above, the wireless power reception apparatus 500 of FIG. 5 having the operating states of FIGS. 6 and 7 performs functions of both the RX resonator 410 and the DC/DC converter 430 of FIG. 4. For example, an inductor $L_2$ in an RX resonator and a switch added to the RX resonator in a wireless power reception apparatus perform the DC/DC conversion function. Accordingly, it is possible to increase a power transfer efficiency and supply a power of an appropriate voltage to the load without the DC/DC converter 430.

The above wireless power reception apparatus is applicable to various electric and electronic devices that use wireless power transmission based on a mutual coupling between resonators.

Figure 8:
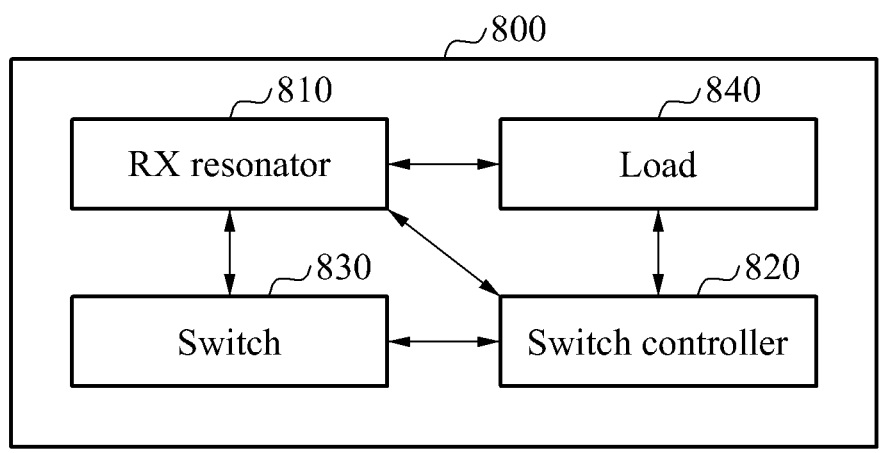
FIG. 8 illustrates another example of a configuration of a wireless power reception apparatus.

FIG. 8 illustrates an example of a configuration of a wireless power reception apparatus 800.

Referring to FIG. 8, the wireless power reception apparatus 800 includes an RX resonator 810, a switch controller 820, a switch 830, and a load 840.

The RX resonator 810 forms a resonance coupling with a first resonance period associated with an envelope of a power to receive the power from a TX resonator. The first resonance period corresponds to an envelope of the first voltage signal. The first voltage signal corresponds to a voltage $V_2$ of the power received by the RX resonator 810.

The switch controller 820 generates, at intervals of the first resonance period, a control signal $V_{SW}$ to deactivate the RX resonator 810 at an off timing corresponding to a time instant at which a maximum energy is stored in an inductor of the RX resonator 810. An example of a configuration of the switch controller 820 will be further described with reference to FIG. 9.

The switch 830 deactivates the RX resonator 810 in response to the control signal $V_{SW}$. The switch 830 activates or deactivates the RX resonator 810 by turning on or off a capacitor included in the RX resonator 810. For example, the switch 830 is connected to the capacitor in the RX resonator 810. In this example, the switch 830 deactivates the RX resonator 810 by turning off the capacitor.

The load 840 receives the power from the RX resonator 810. For example, a voltage applied to the load 840 is limited to a second voltage $V_L$. A second voltage signal corresponding to the second voltage $V_L$ is detected in the load 840.

Figure 9:
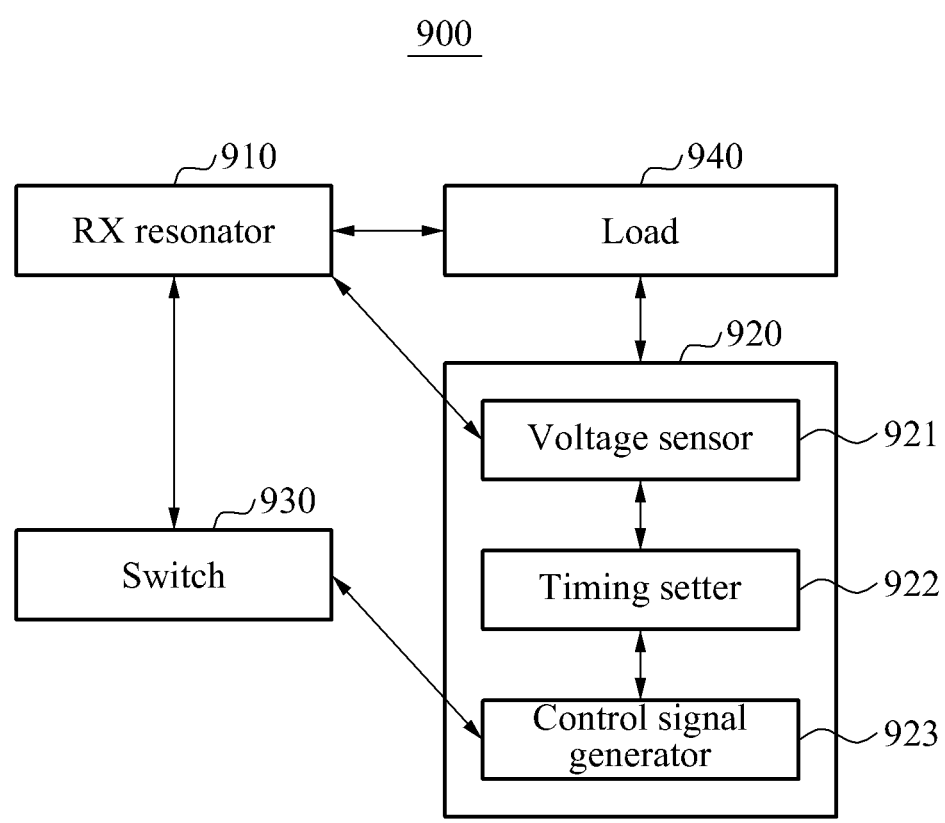
FIG. 9 illustrates an example of a configuration of a switch controller in a wireless power reception apparatus.

FIG. 9 illustrates an example of a configuration of a switch controller 920 in a wireless power reception apparatus 900.

Referring to FIG. 9, the switch controller 920 includes a voltage sensor 921, a timing setter 922, and a control signal generator 923. An RX resonator 910, a switch 930, and a load 940 of FIG. 9 correspond to the RX resonator 810, the switch 830, and the load 840 of FIG. 8, respectively.

The voltage sensor 921 senses either one or both of a first voltage signal corresponding to a power received by the RX resonator 910 and a second voltage signal applied to the load 940. For example, the voltage sensor 921 senses the first voltage signal and an envelope of the first voltage signal.

In the following description, a period of the envelope of the first voltage signal corresponds to a first resonance period, and a period of a peak of the first voltage signal corresponds to a second resonance period.

The timing setter 922 sets an off timing of the switch 930 based on either one or both of the first voltage signal and the second voltage signal. The off timing corresponds to at least one time instant in the first resonance period. In one example, the timing setter 922 detects at least one voltage peak from the sensed first voltage signal during the first resonance period, and sets an off timing based on the detected at least one voltage peak. In another example, the timing setter 922 observes the second voltage signal by deactivating the switch 930 at intervals of at least one predetermined time instant in the first resonance period, and sets, as an off timing, a time instant at which the observed second voltage signal has a maximum magnitude.

Examples of a method of setting an off timing in the timing setter 922 will be further described with reference to FIGS. 11, 12, 15, and 17.

The control signal generator 923 generates a control signal $V_{SW}$ in the set off timing at intervals of the first resonance period. For example, the control signal generator 923 generates the control signal $V_{SW}$ at an off timing set in the first resonance period based on an on-edge and an off-edge of a clock signal having a reference clock frequency.

Figure 10:
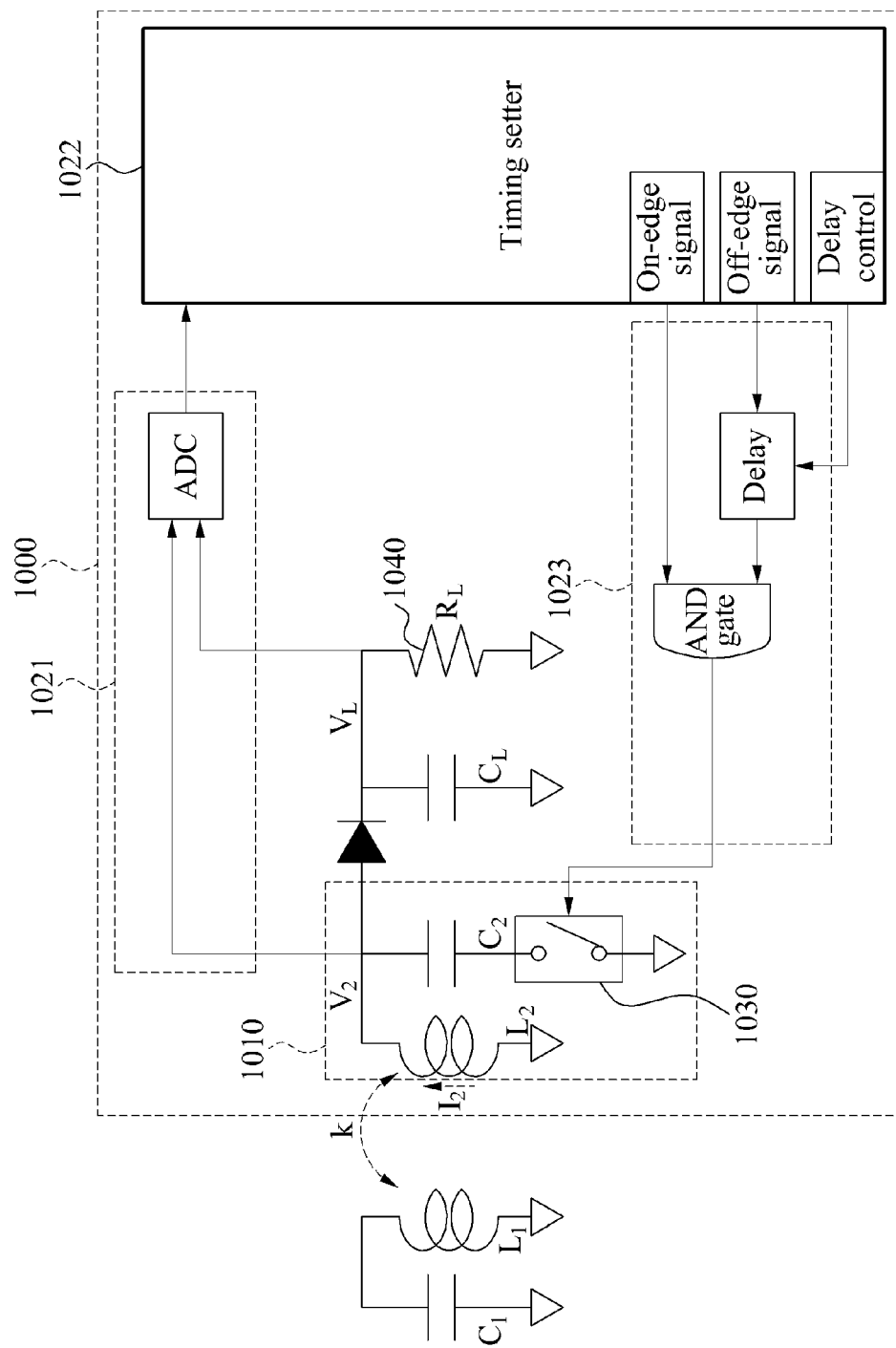
FIG. 10 illustrates another example of a configuration of a wireless power reception apparatus.

FIG. 10 illustrates an example of a configuration of a wireless power reception apparatus 1000.

An RX resonator 1010, a switch controller (not identified by a reference number in FIG. 10), a switch 1030, and a load 1040 included in the wireless power reception apparatus 1000 are similar to the RX resonator 910, the switch controller 920, the switch 930, and the load 940 of FIG. 9, respectively. The switch controller of FIG. 10 includes a voltage sensor 1021, a timing setter 1022, and a control signal generator 1023.

The voltage sensor 1021 includes, for example, an analog-to-digital converter (ADC) as illustrated in FIG. 10. The timing setter 1022 sets an off timing through a delay control. The control signal generator 1023 generates a control signal $V_{SW}$ using an AND gate and a delay line.

Figure 11:
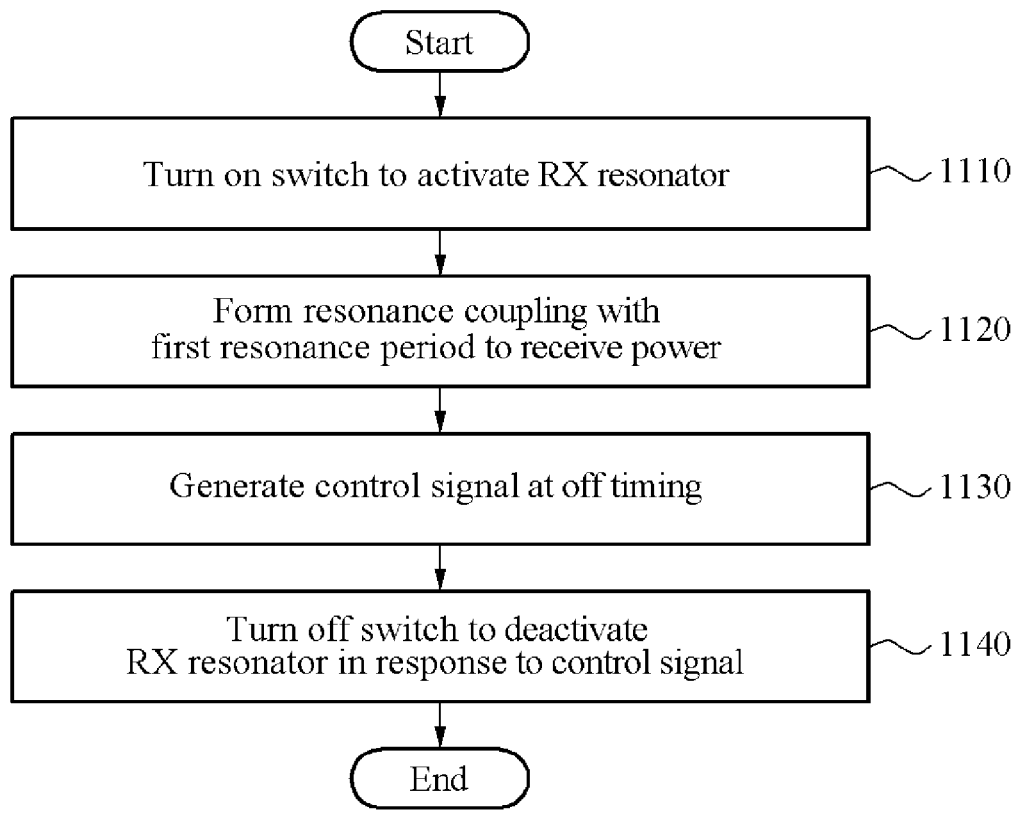
FIG. 11 illustrates an example of a wireless power reception method.

FIG. 11 illustrates an example of a wireless power reception method.

Referring to FIG. 11, in operation 1110, a switch controller turns on a switch to activate an RX resonator. For example, when a first resonance period starts, or when a wireless power reception apparatus starts to operate, the switch controller turns on the switch. Additionally, the switch controller sets, as an on timing, a time instant at which the first resonance period starts. For example, when the switch is initially turned on, a voltage sensor senses a first voltage signal (for example, a first voltage $V_2$), and senses a first resonance period T associated with an envelope of the first voltage signal, and a starting point of the first voltage signal. The switch controller sets the first resonance period and the on timing based on a result of sensing the first voltage signal.

In operation 1120, the RX resonator forms a resonance coupling with the first resonance period to receive a power.

When the RX resonator is activated in operation 1110, the RX resonator forms a resonance coupling with a TX resonator.

In operation 1130, the switch controller generates a control signal (for example, a control signal $V_{SW}$) at an off timing, that is, a time instant at which a maximum energy is stored in an inductor. Examples of setting an off timing to generate a control signal will be further described with reference to FIGS. 12, 15, and 17.

In operation 1140, the switch turns off to deactivate the RX resonator in response to the control signal.

Figure 12:
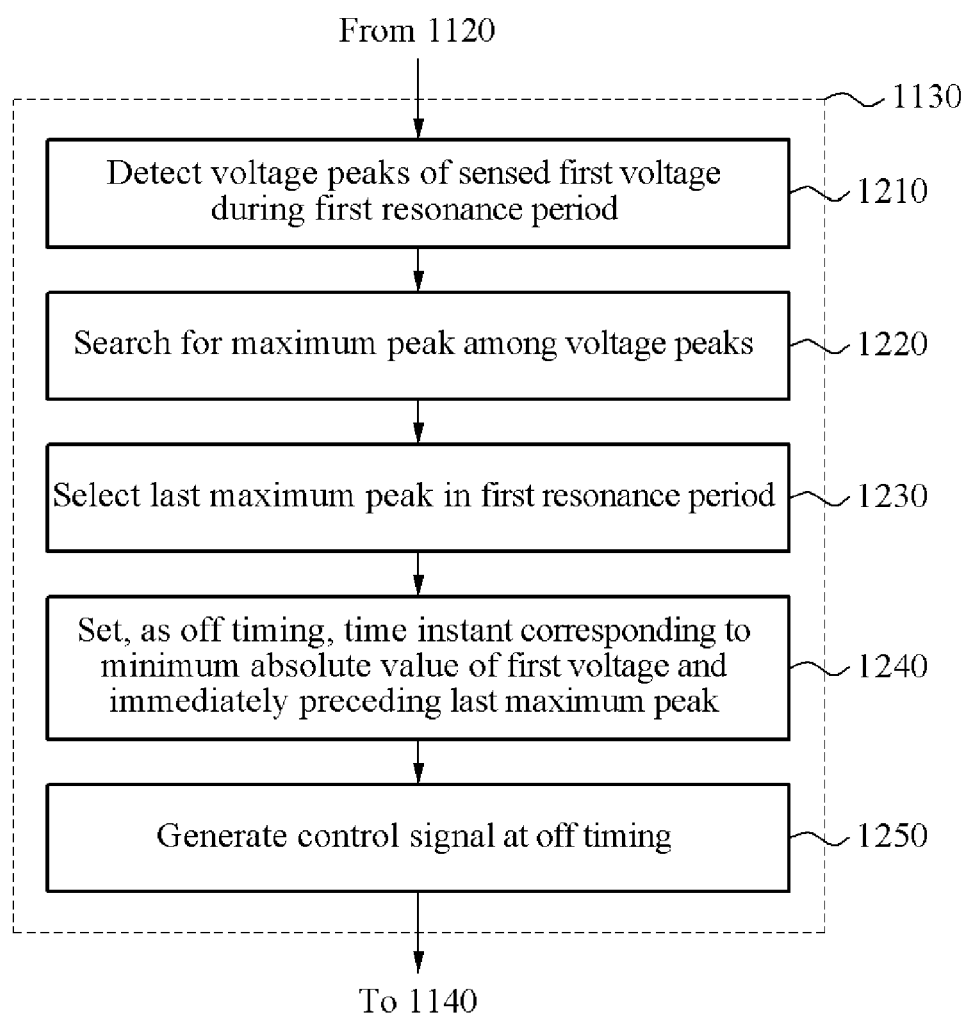
FIG. 12 illustrates an example of an operation of setting an off timing by sensing a first voltage.

FIG. 12 illustrates an example of an operation of setting an off timing by sensing a first voltage.

Referring to FIG. 12, in operation 1210, a timing setter detects a plurality of voltage peaks of the sensed first voltage during the first resonance period. For example, the timing setter detects at least one voltage peak from the sensed first voltage signal during the first resonance period. In this example, the at least one voltage peak refers to peaks of the first voltage signal occurring within the first resonance period.

To detect voltage peaks of the first voltage, the voltage sensor may perform sampling of the first voltage at a high speed.

In operation 1220, the timing setter searches for a maximum peak among the voltage peaks. For example, the timing setter detects at least one maximum peak from the detected at least one voltage peak. The at least one maximum peak corresponds to a time instant at which a maximum first voltage signal $V_{2,max}$ is detected in the first resonance period among the voltage peaks detected in operation 1210. Additionally, a time instant corresponding to a voltage value of the first voltage signal within a predetermined range may be detected as a maximum peak. The predetermined range may be, for example, a range of values similar to a value of the maximum first voltage signal $V_{2,max}$ in the first resonance period. The maximum peak will be further described with reference to FIGS. 13 and 14.

Figure 14:
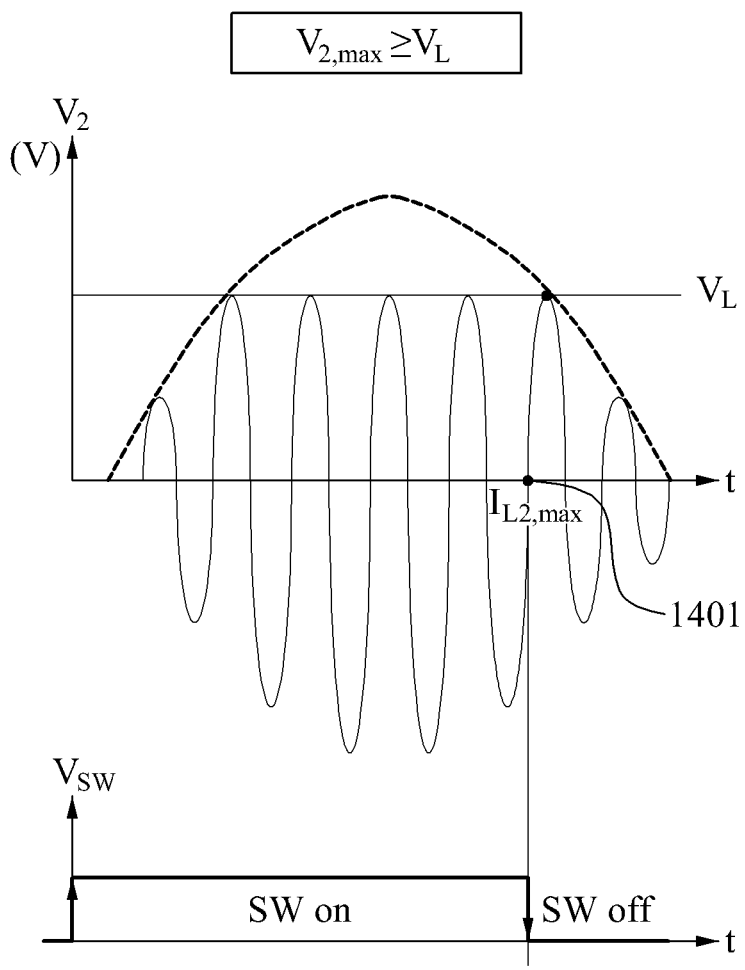

For example, referring to FIG. 14, when a maximum value $V_{2,max}$ of a first voltage $V_2$ is equal to or higher than a value of a second voltage $V_L$, maximum peaks having similar magnitudes may occur. In this example, a plurality of maximum peaks may be detected.

In operation 1230, the timing setter selects a last maximum peak in the first resonance period. For example, the timing setter selects the last maximum peak from the detected at least one maximum peak during the first resonance period. In this example, when a single maximum peak is detected, the detected maximum peak is selected as a last maximum peak.

In operation 1240, the timing setter sets, as an off timing, a time instant that corresponds to a minimum absolute value of the first voltage and that immediately precedes the last maximum peak. For example, the timing setter sets, as an off timing, a time instant that corresponds to a minimum absolute value of the first voltage signal and that precedes a time instant at which the selected last maximum peak is detected. The timing setter may set, as an off timing, a time instant that precedes the time instant at which the selected last maximum peak is detected by a quarter of a second resonance period associated with a peak of the first voltage signal. The set time instant is the last time instant at which a value of the first voltage signal has a value of "0" before the selected last maximum peak, and is also the time instant at which a current flowing in an inductor of the RX resonator has a maximum value. As is well known to one of ordinary skill in the art, a current flowing in an inductor lags a voltage across the inductor by 90°. Thus, a maximum value of the current flowing in the RX resonator precedes a maximum value of the first voltage signal by 90°, i.e., by a quarter of the second resonance period associated with the peak of the first voltage signal.

For example, a current $I_{L2}$ flowing in an inductor of the RX resonator has a maximum value $I_{L2,max}$ at a time instant at which the first voltage signal has the minimum absolute value. Accordingly, at a time instant at which the first voltage of the RX resonator has a value of "0" and that immediately precedes a time instant at which the last maximum peak is detected, the power of the RX resonator exists in the form of current in the inductor.

In operation 1250, a control signal generator generates the control signal at the off timing.

Figure 13:
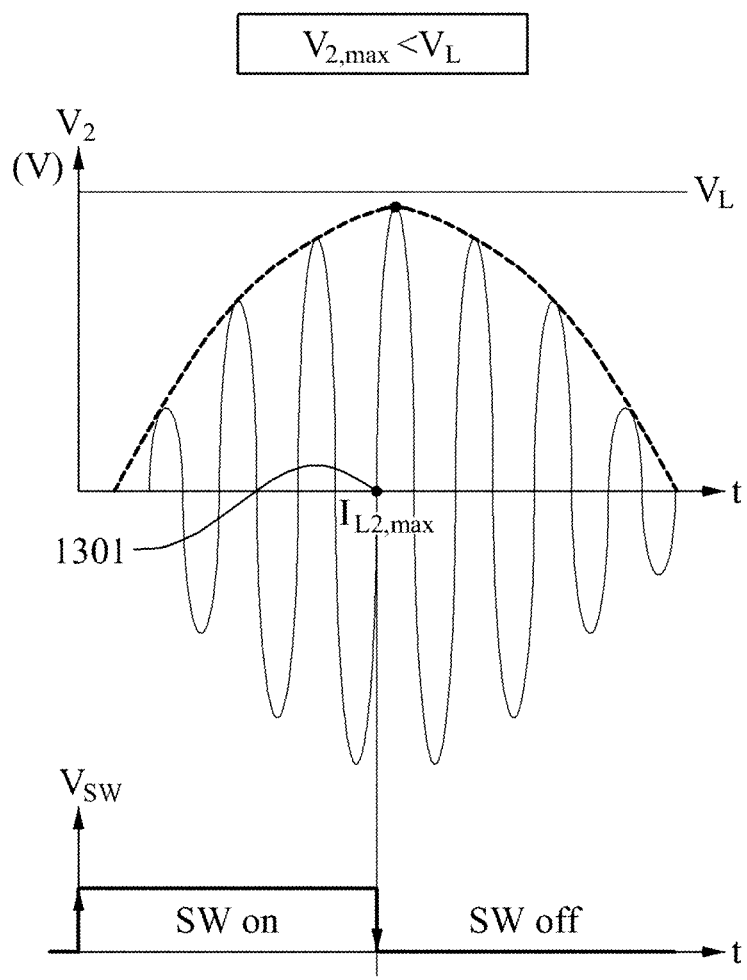
FIGS. 13 and 14 illustrate examples of an off timing set based on a first voltage.

FIGS. 13 and 14 illustrate examples of an off timing set based on a first voltage.

FIG. 13 illustrates an example in which a maximum value $V_{2,max}$ of a first voltage signal is lower than a value of a second voltage signal $V_L$ and in which a single maximum peak is detected. FIG. 14 illustrates an example in which the maximum value $V_{2,max}$ is equal to or higher than the value of the second voltage signal $V_L$ and in which a plurality of maximum peaks are detected. Referring to FIG. 14, a time instant that corresponds to a maximum current $I_{L2,max}$ of an inductor and that immediately precedes a last maximum peak is set as an off timing.

Referring to FIG. 13, to receive a power, a switch is turned on (SW on) at the beginning of a time interval in which receiving of the power is started. When the switch is turned off (SW off) at a time instant 1301 at which the received power exists in the form of current in an inductor, all of the received power is transferred to a load. Additionally, the timing setter sets the time instant 1301 as an off timing. At the time instant 1301, the first voltage $V_2$ has a value of "0" and a current $I_{L2}$ in the inductor has the maximum value $I_{L2,max}$.

In FIG. 14, the maximum value $V_{2,max}$ is equal to or higher than the value of the second voltage signal $V_L$, and accordingly the received power is transferred to the load through a diode, and the switch is turned off at a time instant 1401 at which the received power exists in the form of current in the inductor and that immediately precedes a time instant at which the received power is not transferred to the load (for example, a last time instant at which the first voltage signal is equal to the second voltage signal). Power remaining in the RX resonator after the switch is turned off is transferred to the load. The timing setter sets the time instant 1401 as an off timing. At the time instant 1410, the first voltage $V_2$ has a value of "0" and a current $I_{L2}$ in the inductor has the maximum value $I_{L2,max}$.

Figure 15:
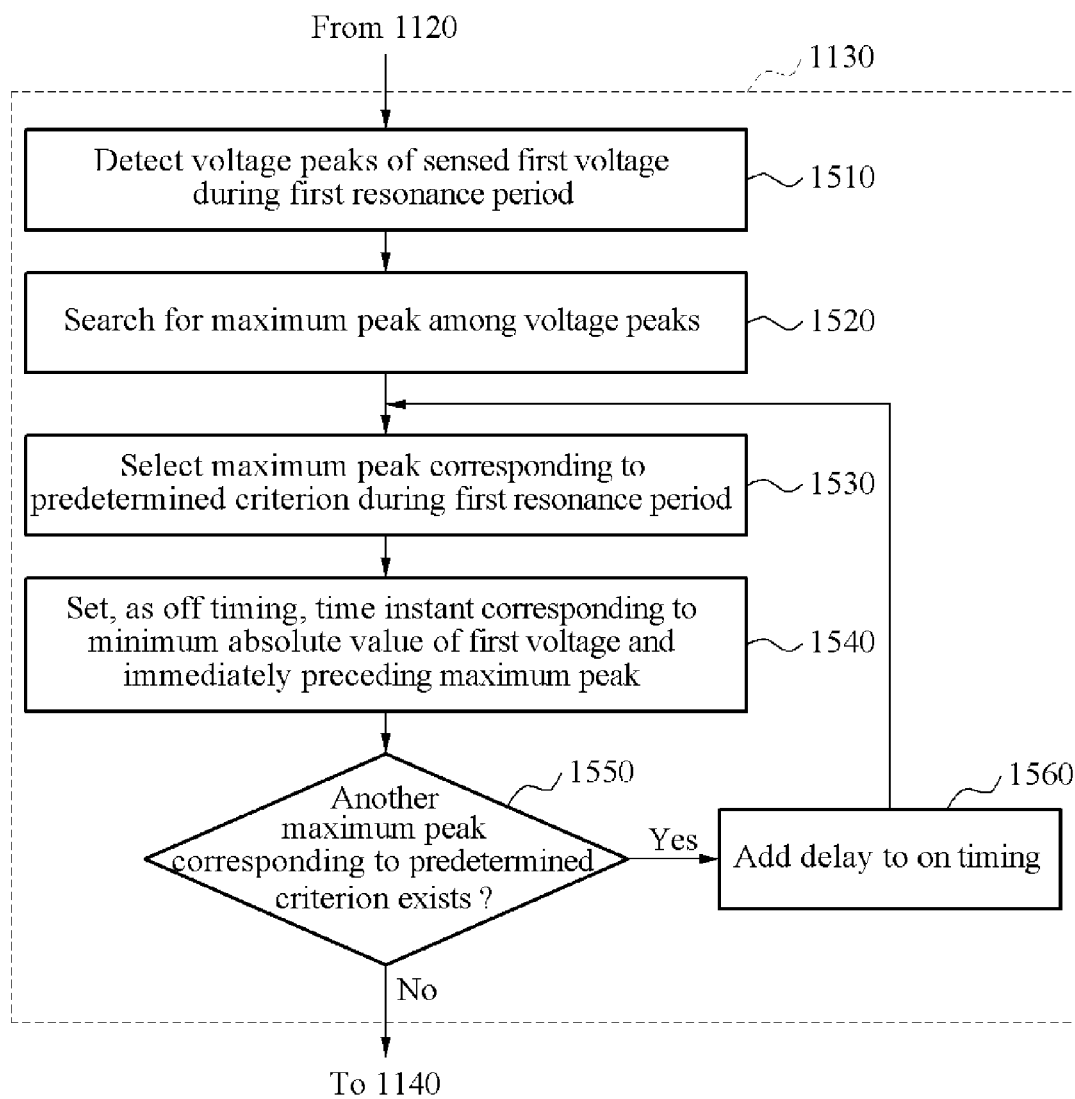
FIG. 15 illustrates an example of an operation of setting a plurality of off timings.

FIG. 15 illustrates an example of an operation of setting a plurality of off timings.

Operations 1510 and 1520 of FIG. 15 are the same as operations 1210 and 1220 of FIG. 12.

Referring to FIG. 15, in operation 1530, the timing setter selects a maximum peak corresponding to a predetermined criterion during the first resonance period. The predetermined criterion is set to obtain a maximum efficiency of transferring a power from an RX resonator to a load. For example, the predetermined criterion may be determined arbitrarily by a user, or may be determined through a simulation and an experimental result.

In operation 1540, the timing setter sets, as an off timing, a time instant that corresponds to a minimum absolute value of the first voltage and that immediately precedes the maximum peak.

In operation 1550, the timing setter determines whether another maximum peak corresponding to the predetermined criterion exists.

In operation 1560, the timing setter adds a delay to the previous on timing in the first resonance period to set a next on timing in the first resonance period. For example, when a plurality of maximum peaks meet the predetermined criterion, the timing setter sets a next on timing in the first resonance period by adding the delay to the previous on timing.

For example, the timing setter may set at least one off timing corresponding to a time instant that corresponds to the minimum absolute value of the first voltage signal and that precedes at least one time instant at which at least one selected maximum peak is detected.

The switch controller repeatedly performs operations 1530 to 1560 until all off timings corresponding to the maximum peaks meeting the predetermined criterion are set.

Figure 16:
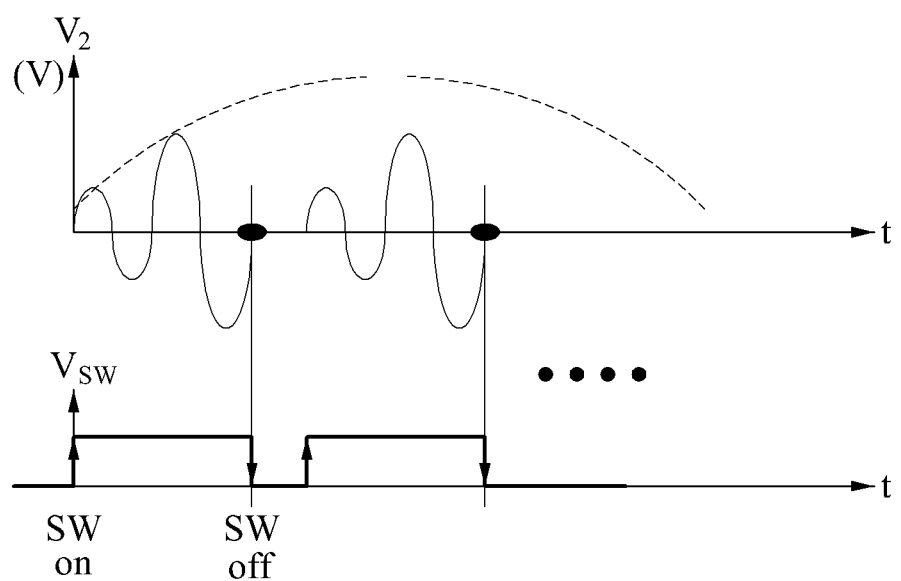
FIG. 16 illustrates an example of a plurality of off timings that are set.

FIG. 16 illustrates an example of a plurality of off timings that are set.

FIG. 16 illustrates an on timing and a plurality of off timings set through operations 1510 to 1560 of FIG. 15. For example, a wireless power reception apparatus repeatedly transfers a power stored in an inductor at intervals of an on timing to a load at intervals of an off timing by repeating the off timing and the on timing during a first resonance period.

Figure 17:
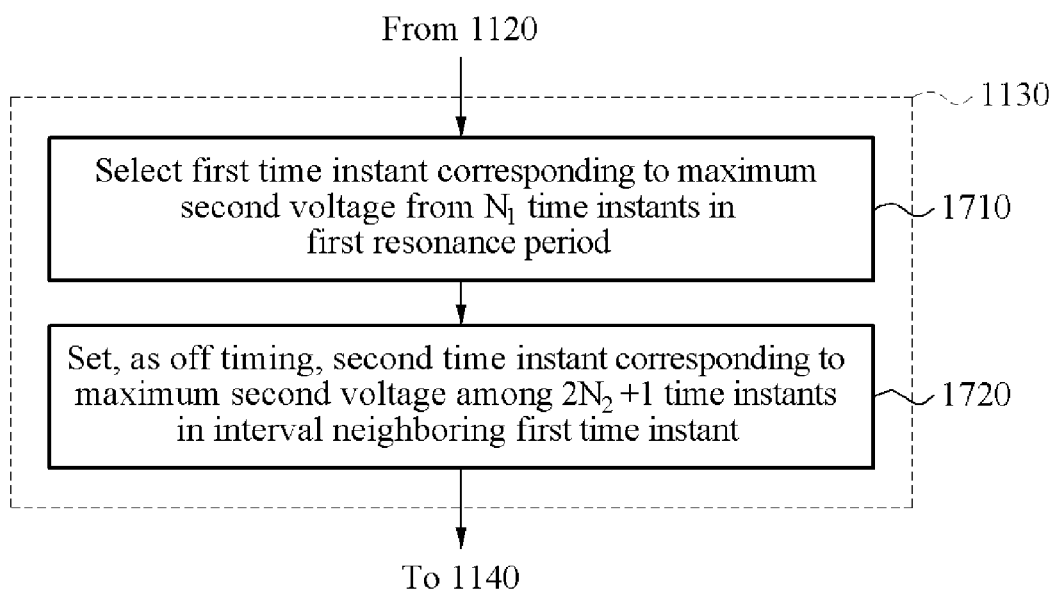
FIG. 17 illustrates an example of an operation of setting an off timing by sensing a second voltage.

FIG. 17 illustrates an example of an operation of setting an off timing by sensing a second voltage.

Referring to FIG. 17, in operation 1710, the switch controller selects a first time instant corresponding to a maximum second voltage signal from $N_1$ time instants in the first resonance period. The first resonance period is determined based on the envelope of the first voltage signal sensed by the voltage sensor.

For example, the switch controller detects $N_1$ second voltage signals by deactivating the switch for each of the $N_1$ time instants, and selects the first time instant at which the maximum second voltage signal among the $N_1$ second voltage signals is detected.

In operation 1720, the switch controller sets, as an off timing, a second time instant corresponding to the maximum second voltage among $2N_2+1$ time instants in an interval including the first time instant.

For example, the switch controller detects $2N_2+1$ second voltage signals by deactivating the switch for each of the $2N_2+1$ time instants, and sets, as an off timing, the second time instant at which the maximum second voltage signal among the $2N_2+1$ second voltage signals is detected.

Figure 18:
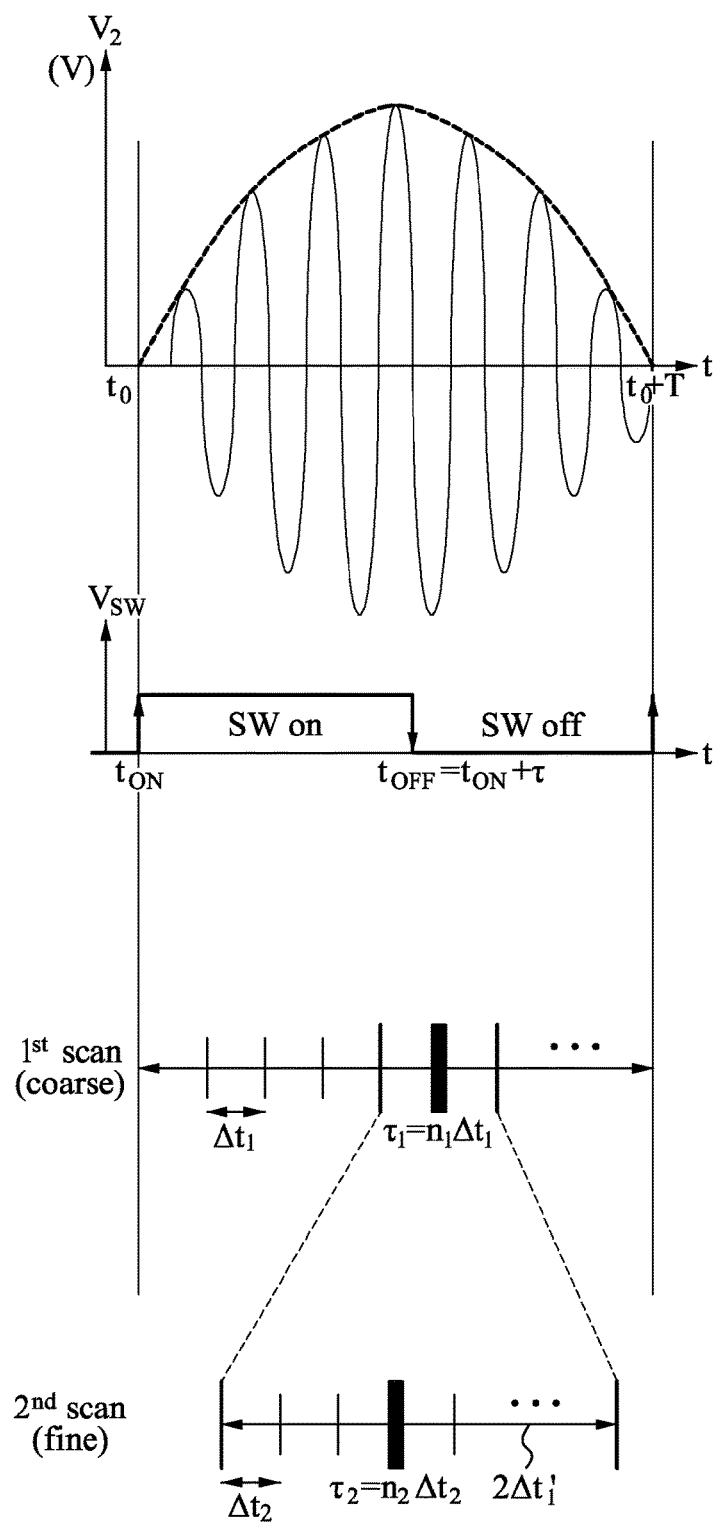
FIG. 18 illustrates an example of an off timing set based on a second voltage.

FIG. 18 illustrates an example of an off timing set based on a second voltage.

Referring to FIG. 18, an on timing $t_{ON}$ of a switch is set as a start point of a first resonance period T. For example, the on timing $t_{ON}$ is represented by "$t_0+nT$." In "$t_0+nT$," n has a value of "0," "1," "2" and so on, and $t_0$ denotes a time instant at which a wireless power reception apparatus starts to operate.

In a $1^{st}$ scan, a switch controller sets an off timing $t_{OFF}$ for each of $N_1$ time instants in the first resonance period T, and senses a second voltage at each of the $N_1$ time instants. For example, the switch controller sets an off timing at each of the $N_1$ time instants, and measures a second voltage signal $N_1$ times. An interval between each two of the $N_1$ time instants in the $1^{st}$ scan may be represented, for example, by $\Delta t_1 = T/N_1$.

The switch controller selects, as $t_{OFF,1} = t_{ON} + n_1\Delta t_1 + dt$ in which $n_1$ has a value of "1" to "$N_1$," a first time instant at which a maximum second voltage signal among $N_1$ second voltage signals is detected. In FIG. 18, $\tau_1$ is defined as $\tau_1 = n_1\Delta t_1$.

In a $2^{nd}$ scan, the switch controller sets the off timing $t_{OFF}$ for each of $2N_2+1$ time instants in an interval $\pm\Delta t_1$ including the first time instant, and senses the second voltage at each of the $2N_2+1$ time instants. For example, the switch controller sets an off timing at each of the $2N_2+1$ time instants, and measures the second voltage signal $2N_2+1$ times. An interval between each two of the $2N_2+1$ time instants in the $2^{nd}$ scan is defined as $\Delta t_2 = \Delta t_1'/N_2$.

The switch controller selects, as $t_{OFF,2} = t_{ON} + n_1\Delta t_1 + dt + n_2\Delta t_2$ in which $n_2$ has a value of "$-N_2$," to "$N_2$," a second time instant at which a maximum second voltage signal among $2N_2+1$ second voltage signals is detected. In FIG. 18, $\tau 2$ is defined as $\tau_2 = n_2\Delta t_2$. The selected second time instant is set as the off timing $t_{OFF}$.

In FIG. 18, $\Delta t_1'$ is set to a value close to a multiple of a second resonance period, and the switch controller observes the second voltage signal at least two times through the above-described process by changing dt to prevent the off timing $t_{OFF}$ from being set to be equal to a time instant corresponding to a peak voltage.

Figure 19:
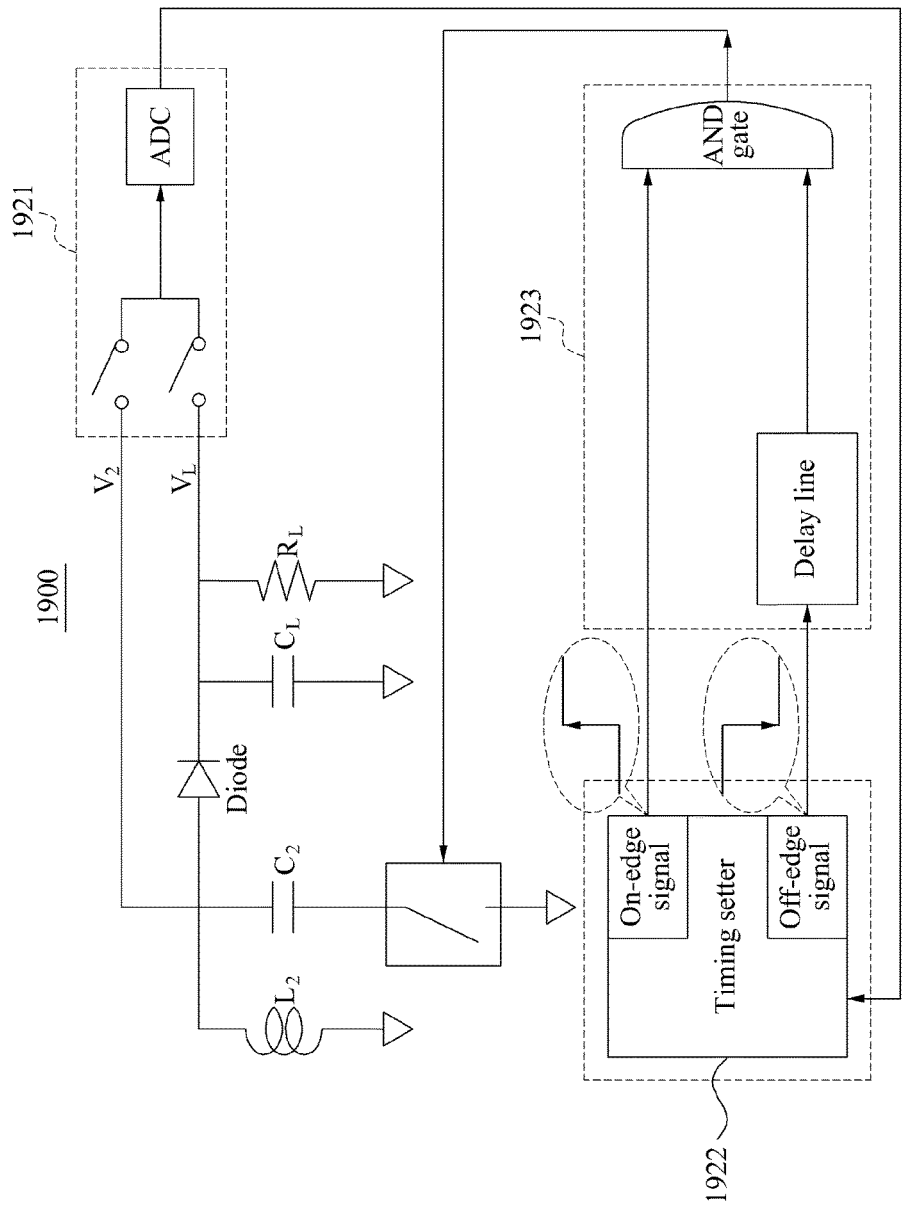
FIG. 19 illustrates an example of a configuration of a control signal generator.

FIG. 19 illustrates an example of a configuration of a control signal generator 1923.

Referring to FIG. 19, a wireless power reception apparatus 1900 includes a voltage sensor 1921, a timing setter 1922, and the control signal generator 1923.

Referring to FIG. 19, the voltage sensor 1921 senses a first voltage $V_2$ and a second voltage $V_L$ using an ADC. Additionally, the voltage sensor 1921 may sense an envelope of a first voltage signal.

The timing setter 1922 generates an on-edge signal and an off-edge signal to generate a control signal. The on-edge signal and the off-edge signal correspond to a rising edge and a falling edge, respectively. When the timing setter 1922 is a digital circuit, a timing resolution of the on-edge signal and the off-edge signal are limited to a reference clock frequency.

The control signal generator 1923 delays the off-edge signal by a predetermined delay using a delay line. The predetermined delay may correspond to, for example, an off timing. When the delayed off-edge signal is input, an AND gate in the control signal generator 1923 generates a control signal to deactivate a switch. The delay line adjusts a fine time instant of switching based on a voltage through a voltage-controlled delay line (VCDL) configured to adjust a time delay based on a voltage.

Figure 20:
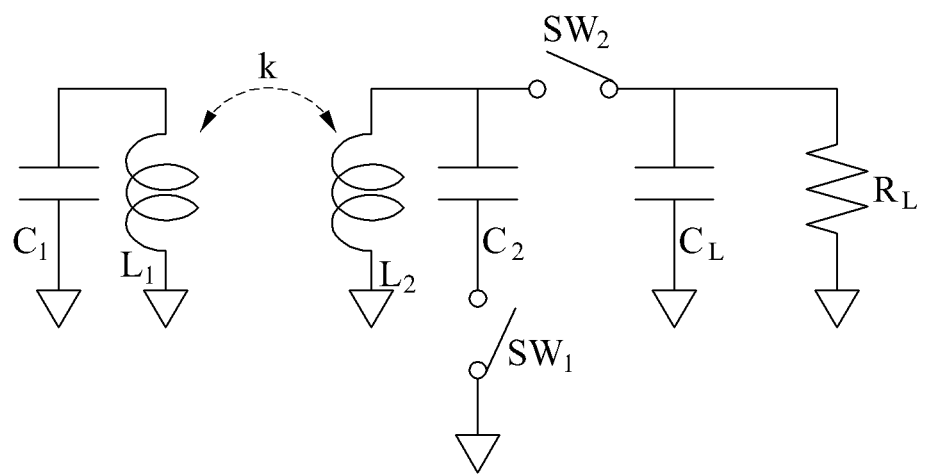
FIG. 20 illustrates an example of a wireless power reception apparatus including two switches.
Figure 21:
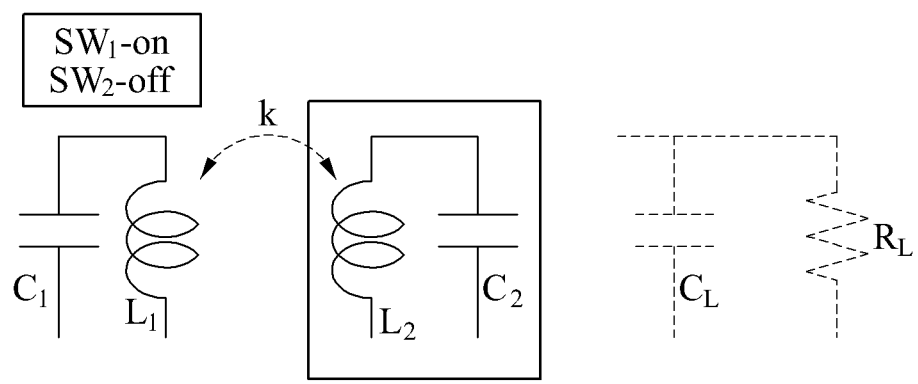
FIGS. 21 and 22 illustrate examples of an operation of the wireless power reception apparatus of FIG. 20.
Figure 22:
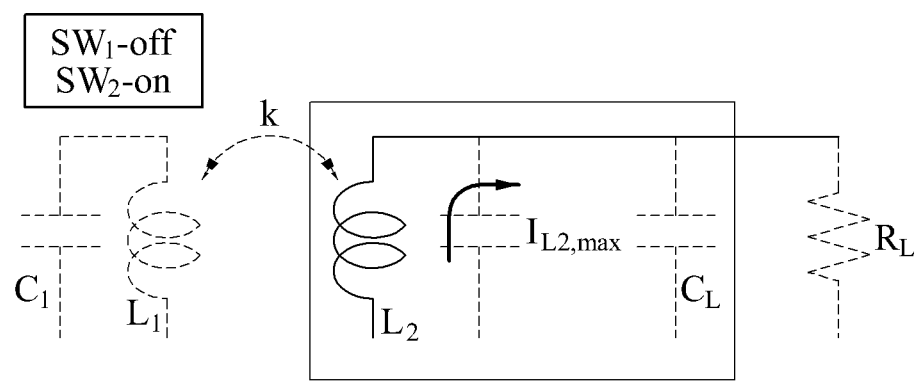

FIG. 20 illustrates an example of a wireless power reception apparatus including two switches, and FIGS. 21 and 22 illustrate examples of operating states of the wireless power reception apparatus of FIG. 20.

The wireless power reception apparatus of FIG. 20 is configured by replacing a diode of a rectifier by an additional switch $SW_2$. As illustrated in FIG. 21, in a state in which a power is received at an RX resonator, the RX resonator is isolated from a load at a rear side of the RX resonator by turning off the additional switch $SW_2$. As illustrated in FIG. 22, when a switch $SW_1$ is turned off and the additional switch $SW_2$ is turned on, a power stored in an inductor of the RX resonator is transferred to the load. When the power is completely transferred to the load, the additional switch $SW_2$ is turned off to prevent the power from returning to the RX resonator.

According to the various examples described above, it is possible to increase an efficiency of transferring power received by an RX resonator to a load by switching without using a DC/DC converter. Additionally, it is possible to supply power having an appropriate voltage despite a first voltage being lower than a second voltage. Thus, it is possible to reduce a size and a cost required to implement a wireless power transmission system.

The switch controller 820 in FIG. 8, the switch controller 920, the voltage sensor 921, the timing setter 922, and the control signal generator 923 in FIG. 9, the voltage sensor 1021, the timing setter 1022, and the control signal generator 1023 in FIG. 10, and the voltage sensor 1921, the timing setter 1922, and the control signal generator 1923 in FIG. 19 that perform the various operations described with respect to FIGS. 5-22 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a wireless power transmission system described herein may refer to a mobile device such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, or a sensor, and or a stationary device such as a desktop PC, a high definition television (HDTV), an optical disc player, a set-top box, or a home appliance, or any other device known to one of ordinary skill in the art that is capable of wireless power transmission and reception consistent with that which is disclosed herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power reception apparatus comprising:
    a reception (RX) resonator configured to form a resonance coupling with a first resonance period associated with an envelope of a power to receive the power from a transmission (TX) resonator;
    a switch controller configured to:
        set an off timing, corresponding to a time instant at which a maximum energy is stored in an inductor of the RX resonator, based on a sensed first voltage signal corresponding to the power received by the RX resonator during the first resonance period; and
        generate, at intervals of the first resonance period, a control signal to deactivate the RX resonator at the set off timing; and
    a switch configured to deactivate the RX resonator in response to the generated control signal.

2. The wireless power reception apparatus of claim 1, wherein the switch controller comprises:
    a voltage sensor configured to sense the first voltage signal corresponding to the power received by the RX resonator;
    a timing setter configured to set the off timing based on the first voltage signal; and
    a control signal generator configured to generate the control signal at the set off timing at the intervals of the first resonance period.

3. The wireless power reception apparatus of claim 2, wherein the timing setter is further configured to detect at least one voltage peak from the sensed first voltage signal during the first resonance period, and set the off timing based on the detected at least one voltage peak.

4. The wireless power reception apparatus of claim 3, wherein the timing setter is further configured to detect at least one maximum peak from the detected at least one voltage peak, select a last maximum peak from the detected at least one maximum peak during the first resonance period, and set, as the off timing, a time instant that corresponds to a minimum absolute value of the first voltage signal and that precedes a time instant at which the selected last maximum peak is detected.

5. The wireless power reception apparatus of claim 4, wherein the timing setter is further configured to set, as the off timing, a time instant that precedes the time instant at which the selected last maximum peak is detected by a quarter of a second resonance period associated with a peak of the first voltage signal.

6. The wireless power reception apparatus of claim 3, wherein the timing setter is further configured to detect at least one maximum peak from the detected at least one voltage peak, select at least one maximum peak corresponding to a predetermined criterion from the detected at least one maximum peak during the first resonance period, and set at least one off timing corresponding to a time instant that corresponds to a minimum absolute value of the first voltage signal and that precedes at least one time instant at which the selected at least one maximum peak is detected.

7. The wireless power reception apparatus of claim 2, wherein the control signal generator comprises a delay line configured to delay a reference clock signal having a clock frequency by a predetermined delay, and generate the control signal.

8. The wireless power reception apparatus of claim 1, wherein the switch is further configured to deactivate the RX resonator by turning off a capacitor of the RX resonator.

9. The wireless power reception apparatus of claim 1, wherein the switch controller is further configured to observe a second voltage signal applied to a load by deactivating the switch at intervals of at least one predetermined time instant in the first resonance period, and set, as an off timing, a time instant at which the observed second voltage signal has a maximum magnitude.

10. The wireless power reception apparatus of claim 9, wherein the switch controller is further configured to detect $N_1$ second voltage signals by deactivating the switch at each of $N_1$ time instants in the first resonance period, select a first time instant at which a maximum second voltage signal among the $N_1$ second voltage signals is detected, detect $2N_2+1$ second voltage signals by deactivating the switch at each of $2N_2+1$ time instants in a predetermined interval comprising the first time instant, and set, as the off timing, a second time instant at which a maximum second voltage signal among the $2N_2+1$ second voltage signals is detected.

11. A wireless power reception apparatus comprising:
    a reception (RX) resonator configured to form a resonance coupling with a first resonance period associated with an envelope of a power to receive the power from a transmission (TX) resonator;
    a switch controller configured to generate, at intervals of the first resonance period, a control signal to deactivate the RX resonator at an off timing corresponding to a time instant at which a maximum energy is stored in an inductor of the RX resonator; and
    a switch configured to deactivate the RX resonator in response to the control signal, wherein the switch controller is further configured to observe a second voltage signal applied to a load by deactivating the switch at intervals of at least one predetermined time instant in the first resonance period, and set, as an off timing, a time instant at which the observed second voltage signal has a maximum magnitude.

12. The wireless power reception apparatus of claim 11, wherein the switch controller is further configured to detect $N_1$ second voltage signals by deactivating the switch at each of $N_1$ time instants in the first resonance period, select a first time instant at which a maximum second voltage signal among the $N_1$ second voltage signals is detected, detect $2N_2+1$ second voltage signals by deactivating the switch at each of $2N_2+1$ time instants in a predetermined interval comprising the first time instant, and set, as the off timing, a second time instant at which a maximum second voltage signal among the $2N_2+1$ second voltage signals is detected.

13. A wireless power reception method comprising:
    forming a resonance coupling with a first resonance period associated with an envelope of a power to receive the power from a transmission (TX) resonator;
    setting an off timing, corresponding to a time instant at which a maximum energy is stored in an inductor of a reception (RX) resonator, based on a sensed first voltage signal corresponding to the power received by the RX resonator from the TX resonator during the first resonance period;
    generating, at intervals of the first resonance period, a control signal to deactivate the RX resonator at the set off timing; and
    deactivating the RX resonator in response to the generated control signal.

14. The wireless power reception method of claim 13, wherein the generating comprises:
    sensing the first voltage signal corresponding to the power;
    setting the off timing based on the first voltage signal; and
    generating the control signal at the set off timing at intervals of the first resonance period.

15. The wireless power reception method of claim 14, wherein the setting comprises: detecting at least one voltage peak from the sensed first voltage signal during the first resonance period; and setting the off timing based on the detected at least one voltage peak.

16. The wireless power reception method of claim 15, wherein the detecting comprises detecting at least one maximum peak from the detected at least one voltage peak; and the setting of the off timing based on the detected at least one voltage peak comprises: selecting a last maximum peak from the detected at least one maximum peak during the first resonance period; and setting, as the off timing, a time instant that corresponds to a minimum absolute value of the first voltage signal and that precedes a time instant at which the selected last maximum peak is detected.

17. The wireless power reception method of claim 16, wherein the setting, as the off timing, of the time instant that corresponds to the minimum absolute value of the first voltage signal and that precedes the time instant at which the selected last maximum peak is detected comprises setting, as the off timing, a time instant that precedes the time instant at which the selected last maximum peak is detected by a quarter of a second resonance period associated with a peak of the first voltage signal.

18. The wireless power reception method of claim 15, wherein the detecting comprises detecting at least one maximum peak from the detected at least one voltage peak; and the setting of the off timing based on the detected at least one voltage peak comprises: selecting at least one maximum peak corresponding to a predetermined criterion from the detected at least one maximum peak during the first resonance period; and setting at least one off timing corresponding to a time instant that corresponds to a minimum absolute value of the first voltage signal and that precedes at least one time instant at which the selected at least one maximum peak is detected.

19. The wireless power reception method of claim 14, wherein the generating comprises delaying a reference clock signal having a clock frequency by a predetermined delay, and generating the control signal.

20. The wireless power reception method of claim 13, wherein the deactivating comprises deactivating the RX resonator by turning off a capacitor of the RX resonator.

21. The wireless power reception method of claim 13, wherein the generating comprises: observing a second voltage signal applied to a load by deactivating the switch at intervals of at least one predetermined time instant in the first resonance period; and setting, as an off timing, a time instant at which the observed second voltage signal has a maximum magnitude.

22. The wireless power reception method of claim 21, wherein the observing comprises: detecting $N_1$ second voltage signals by deactivating the switch at each of $N_1$ time instants in the first resonance period; selecting a first time instant at which a maximum second voltage signal among the $N_1$ second voltage signals is detected; and detecting $2N_2+1$ second voltage signals by deactivating the switch at each of $2N_2+1$ time instants in a predetermined interval comprising the first time instant; and the setting, as an off timing, of the time instant at which the observed second voltage signal has the maximum magnitude comprises setting, as the off timing, a second time instant at which a maximum second voltage signal among the $2N_2+1$ second voltage signals is detected.

23. A wireless power reception method comprising:
    forming a resonance coupling with a first resonance period associated with an envelope of a power to receive the power from a transmission (TX) resonator;
    generating, at intervals of the first resonance period, a control signal to deactivate a reception (RX) resonator at an off timing corresponding to a time instant at which a maximum energy is stored in an inductor of the RX resonator; and
    deactivating the RX resonator in response to the control signal, wherein the generating comprises: observing a second voltage signal applied to a load by deactivating the switch at intervals of at least one predetermined time instant in the first resonance period; and setting, as an off timing, a time instant at which the observed second voltage signal has a maximum magnitude.

24. The wireless power reception method of claim 23, wherein the observing comprises: detecting $N_1$ second voltage signals by deactivating the switch at each of $N_1$ time instants in the first resonance period; selecting a first time instant at which a maximum second voltage signal among the $N_1$ second voltage signals is detected; and detecting $2N_2+1$ second voltage signals by deactivating the switch at each of $2N_2+1$ time instants in a predetermined interval comprising the first time instant; and the setting, as an off timing, of the time instant at which the observed second voltage signal has the maximum magnitude comprises setting, as the off timing, a second time instant at which a maximum second voltage signal among the $2N_2+1$ second voltage signals is detected.

* * * * *